United States Patent Office 3,480,552
Patented Nov. 25, 1969

3,480,552
MANUFACTURE OF MATERIALS CAPABLE OF AMPLIFYING WAVE ENERGY
Joseph V. Fisher, Valencia, Pa., assignor to Semi-Elements, Inc., Saxonburg, Pa., a corporation of Pennsylvania
No Drawing. Continuation of application Ser. No. 194,151, May 11, 1962. This application June 9, 1965, Ser. No. 462,710
Int. Cl. H01p *3/16, 1/02;* C09k *1/04*
U.S. Cl. 252—62.51                                6 Claims This application is a continuation of copending application Ser. No. 194,151, filed May 11, 1962, now abandoned.

This invention relates to solid-state wave amplifying materials, and more particularly to materials of the type described capable of amplifying wave energy by stimulated emission of radiation and containing rare earths and transition elements of different valence states as doping agents.

Although not limited thereto, the present invention is particularly concerned with materials for amplifying microwave energy by stimulated emission of radiation (masers) and materials for amplifying light energy by such stimulated emission of radiation (lasers). Generally speaking, masers and lasers may be defined as devices for amplifying or generating wave energy by utilizing molecules in the excited state of a wave transition. Interaction between these excited molecules and a wave energy field produces additional radiation and hence amplification by "stimulated emission." The operation of masers and lasers is dependent upon the fact that in certain materials the electrons surrounding the nucleus of an atom may be in different energy states. These energy states may be thought of as arising from the interaction of the electron spins with internal or external fields. We may therefore refer to them as electron "spin" states. The energies of the electron spin states may be varied by an external wave energy field; and the energy difference between two given electron spin states is determined by the magnitude of the external field.

For example, part of the electron spins in certain materials may be at a lower energy state $E_1$, while the remainder may be at a higher energy state $E_2$. The material capable of amplifying wave energy by stimulated emission of radiation is in thermal equilibrium, corresponding to a normal of relaxed condition, when there is an excess electron spin population in the lower energy state $E_1$. Electron spins in the energy states $E_1$ and $E_2$ can interact with a raditation field of appropriate frequency and either absorb energy from the radiation field while advancing to a state of greater energy or, under the influence of the radiation field, can give up some of their energy and drop to a state of lower energy. The amount of energy thus transferred (i.e. $E_2-E_1$) is related to the frequency of the radiation field by the following equation:

$$E_2-E_1=hV$$

where $h$ is Planck's constant and V is the frequency.

If a suitable material having an excess electron spin population in a higher energy state is placed in a resonant cavity or the like and if wave energy of appropriate frequency is fed into the cavity in the case of a maser, or pumped into the material in the case of a laser, the electron spins in the higher energy state will revert to a lower energy state, thereby releasing energy which amplifies the signal pumped into the material.

In the case of a maser, the material capable of amplifying wave energy by stimulated emission of radiation is placed in a resonant cavity, and a magnetic field applied across the material to create an excess spin population in the upper energy level. In the case of lasers, the material capable of amplifying wave energy by stimulated emission of radiation is placed within a resonator comprising a pair of spaced mirrors separated by a distance equal to an even multiple of the wavelength which it is desired to amplify. By pumping light energies of many different frequencies into the material, a steady oscillation of a single wavelength can be built up between the mirrors.

In providing any material suitable for maser and laser applications, it is considered desirable, particularly in laser applications, to have one with a broad absorption band and a narrow emission band. That is, the band of frequencies at which the material will absorb energy to raise the electron spins from state $E_1$ to state $E_2$, mentioned above, should be as wide as possible. On the other hand, the band of frequencies at which electrons release energy and drop from state $E_2$ to state $E_1$ should be as narrow as possible to minimize the amount of power required. In the case of lasers, the material will fluoresce or radiate light at the emission bands which are usually called "fluorescence lines."

Synthetic materials capable of amplifying wave energy by stimulated emission of radiation are in the form of single crystals comprising a host material doped with a rare earth or transition element. It is well known that in materials of this type the absorption and emission bands of frequencies depend upon the valences of the rare earth or transition element ions in the host material of the crystal. In other words, the number of electrons or electron spins surrounding the nucleus of each atom of the doping material determines its characteristics as to absorption and emission of radiation, and since the valence or number of electrons can be made to vary, the characteristics of the crystal can also be made to vary.

The present invention is concerned with crystals containing rare earths or transition elements in various valence states. In the manufacture of such crystals, a host material and about 0.005 to 5 percent by weight of any element selected from the rare earths and transition elements, usually in the form of a fluoride or other halide of the element, are mixed together and heated in a graphite crucible or mold to the melting temperature of the host material, the mold being withdrawn from the heating zone gradually, usually over a period of days, whereby a single crystal will grow from a seed at one end of the mold progressing toward the other end as the mold is withdrawn from the heating zone. I have found by subjecting a crystal grown in this manner to electromagnetic wave energy, particularly to wave energy above the microwave region, that the valence state of the rare earths or transition elements may be made to vary. For example, both X-rays and infrared energy can be employed to change valence states. The present invention is concerned primarily with the utilization of infrared energy for this purpose. Specifically, I have found that by withdrawing the mold from the heating zone at certain critical rates and by thereafter selectively heat treating the crystals (i. e., selectively subjecting them to infrared rays), the valences of those crystals may be made to vary with certainty and on a production basis.

Accordingly, as an overall object, the present invention seeks to provide a method for producing crystals adapted to amplify wave energy by stimulated emission of radiation, and containing as doping agents an element or elements selected from the rare earths and transition elements in different valence states.

More specifically, an object of the invention is to provide a method for producing crystals containing rare earths or transition elements in different valence states by the use of electromagnetic wave energy.

In order to successfully produce materials capable of amplifying wave energy by stimulated emission of radiation, the host material must exist as a single crystal and must be as pure as possible, on the order of 99% or greater purity. It has been found that certain host materials, when doped with rare earths or transition elements in minute amounts and formed into single crystals, will amplify wave energy by stimulated emission of radiation. Such host materials include, without limitation, the following:

Calcium fluoride ($CaF_{22}$)
Barium fluoride ($BaF_2$)
Cadmium fluoride ($CdF_2$)
Strontium fluoride ($SrF_2$)
Magnesium oxide (MgO)
Lanthanon oxides ($Ln_2O_3$)
Calcium oxide (CaO)
Calcium tungstate ($CaWO_4$)
Yttrium oxide ($Y_2O_3$)
Aluminum oxide ($Al_2O_3$)
Titanium dioxide ($TiO_2$)
Manganese fluoride ($MnF_2$)
Scandium oxide ($Sc_2O_3$)
A mixture of strontium fluoride and calcium fluoride.
A mixture of strontium fluoride and barium fluoride.
A mixture of strontium fluoride, barium fluoride and calcium fluoride.

In the manufacture of materials capable of amplifying wave energy by stimulated emission of radiation, one or more of the host materials enumerated above are mixed with about 0.005 to 5 percent by weight of a rare earth or transition element, depending upon requirements, selected from the following, it being understood that other possible elements may be employed without departing from the spirit and scope of the invention:

| | |
|---|---|
| Cerium (Ce) | Manganese (Mn) |
| Chromium (Cr) | Neodymium (Nd) |
| Cobalt (Co) | Nickel (Ni) |
| Dysprosium (Dy) | Praseodymium (Pr) |
| Erbium (Er) | Rubidium (Rb) |
| Europium (Eu) | Samarium (Sm) |
| Gadolinium (Gd) | Terbium (Tb) |
| Holmium (Ho) | Thullium (Tm) |
| Iron (Fe) | Titanium (Ti) |
| Lanthanum (La) | Vanadium (V) |
| Lead (Pd) | Ytterbium (Yb) |
| Lutetium (Lu) | Zinc (Zn) |

In manufacturing the crystals, the host material and about 0.005 to 5 percent by weight of a selected rare earth or transition element, or a combination of rare earths and transition elements, usually in the form of a halide, are mixed together and heated in a graphite crucible or mold in an evacuated chamber to the melting temperature of the mixture, the mold being withdrawn from the heating chamber gradually, usually over a period of days, whereby a single crystal will grow from a seed at one end of the mold progressing toward the other end as the mold is withdrawn from the heating chamber.

If an attempt were made to grow crystals by simply mixing the host material with a rare earth or transition element and heating the mixture, the resulting product would be very impure, due primarily to the fact that the rare earths and transition elements, when heated, form oxides which contaminate the crystals. Accordingly, a leaching agent, for example, ammonium fluoride which is shown and described in my copending application Ser. No. 189,302, filed Apr. 23, 1962 and now U.S. Patent 3,203,899, is mixed with the host material and rare earth or transition element and the mixture of the three constituents placed in the aforesaid graphite crucible. The leaching agent must be such that it will readily combine with excess water and other impurities and boil off or volatilize in the evacuated chamber at a temperature lower than the melting point of the host material. At the same time, the leaching agent must be such that it will not combine with the rare earth addition since otherwise the amount of rare earth in the final crystal cannot be accurately controlled. Preferably, a leaching agent is selected which satisfies the above requirements and which boils off or volatilizes beneath the melting point of the host material, which melting point is usually above 1000° C.

I have found that in order to grow a crystal containing what appears to be a monovalent element selected from the rare earths and transition elements, the mold or crucible containing the crystal must be withdrawn from the evacuated heating zone at a rate of about 3 to 6 inches per day. In order to produce crystals containing a divalent element selected from the rare earths and transition elements, the mold or crucible must be withdrawn from the evacuated heating zone at a rate of about 1.5 to 3 inches per day and the contents thereafter annealed for about 0.5 to 6 hours at a temperature which is in the range of 100° C. to 200° C. and preferably 150° C. below the melting point of the host material. Finally, in order to produce a crystal containing a trivalent element selected from the rare earths and transition elements, the mold or crucible containing the melted mixture must be withdrawn from the evacuated heating zone at a rate of about 1.5 inches per day and the contents thereafter annealed for at least twenty-four hours at about 100° C. to 200° C. and preferably 150° C. below the melting point of the host material.

As a specific example, a crystal of calcium fluoride containing what appears to be monovalent samarium may be produced by mixing 80 grams of calcium fluoride with 1 gram of a leaching agent and 100 milligrams of samarium fluoride and placed in a cylindrical graphite mold or crucible having a diameter in the range of about $5/16$ to $3/8$ inch. Thereafter, the mixture is heated to the range of about 1300° C. to 1500° C. in a vacuum whereby the leaching agent, combined with excess water and oxides, boils off at about 200° C. to 500° C. during the heat-up period. In order to produce a crystal containing what appears to be monovalent samarium, the mold is withdrawn from the heating zone at a rate of 5 inches per day without further annealing. In order to produce the divalent form of samarium, the mold is withdrawn from the heating zone at about 2.5 inches per day and the contents thereafter annealed at 1000° C. to 1300° C. for 1 hour. Finally, in order to produce the trivalent form of samarium, the mold is withdrawn from the heating zone at a rate of 1.5 inches per day and the contents thereafter annealed for twenty-four hours at 1000° C. to 1300° C.

As another example, 80 grams of barium fluoride may be thoroughly mixed with 2 grams of a leaching agent and 0.5 gram of europium fluoride and placed in an elongated graphite mold of $5/16$ to $3/4$ inch diameter. Thereafter, the mixture is heated to the range of about 1200° C. to 1500° C. in a vacuum to facilitate boiling off of the leaching agent and impurities, and the mold withdrawn from the heating zone at a rate of about 5 inches per day to form a single pure crystal starting from a seed at the bottom of the mold. The resulting crystal contains what appears to be monovalent europium. In order to produce divalent europium, the mold is withdrawn from the heating zone at a rate of about 3 inches per day and the contents thereafter annealed at 1000° C. to 1175° C. for 1 hour. In order to produce a crystal containing trivalent europium, the mold is withdrawn from the heating zone at a rate of about 1.5 inches per day and the contents thereafter annealed for twenty-four hours at 900° C. to 1175° C.

As still another example, 80 grams of calcium fluoride may be thoroughly mixed with 1 gram of neodymium fluoride and 5 grams of a leaching agent and placed in an elongated mold or crucible. The mixture is thereafter heated to the range of about 1300° C. to 1500° C. in a vacuum, and the mold withdrawn from the heating zone at a rate of about 5 inches per day to form a single pure crystal containing what appears to be the monovalent form of neodymium. In order to produce the divalent form of neodymium the crucible is withdrawn from the heating zone at rate of 3 inches per day and the contents thereafter annealed for about 1 hour at a temperature in the range of 1100° C. to 1300° C. Finally in order to produce a crystal containing trivalent neodymium the crucible or mold is withdrawn from the heating zone at a rate of about 1.5 inches per day and the contents thereafter annealed for about twenty-four hours at a temperature in the range of 1100° C. to 1300° C.

Although the invention has been shown in connection with certain specific embodiments it will be readily apparent to those skilled in the art that various changes in composition and method steps may be made to suit requirements without departing from the spirit and scope of the invention.

I claim as my invention:

1. In the method for producing single crystals capable of amplifying wave energy by stimulated emission of radiation, the steps of mixing a host material with a leaching agent and a compound containing a dopant element selected from the group consisting of the rare earths and transition elements, the host material being such as to accommodate stimulated emission of radiation in single crystal form, placing said mixture in a container, heating said container with the mixture therein in a heating zone to melt the mixture within the container, withdrawing melted material from the heating zone whereby a single crystal will be formed starting from a seed, and subjecting the crystal thus formed to infrared energy to permanently change the valence state of the dopant element therein, which change in valence state will persist at room temperature.

2. The method of claim 1 wherein the melted material is withdrawn from the heating zone at such a rate and the infrared energy applied to the resulting crystal at such intensity and time that the final crystal will contain a dopant element in the divalent state.

3. The method of claim 1 wherein the melted material is withdrawn from the heating zone at such a rate and the infrared energy applied to the resulting crystal at such intensity and time that the final crystal will contain a dopant element in the trivalent state.

4. In the method for producing crystals capable of amplifying wave energy by stimulated emission of radiation and containing about 0.005 to 5 percent by weight of a divalent element selected from the group consisting of the rare earths and transition elements, the steps of mixing a host material with a leaching agent and a compound containing an element selected from the group consisting of the rare earths and transition elements capable of existing in a divalent form, the host material being such as to accommodate stimulated emission of radiation in single crystal form, placing said mixture in an elongated mold, heating said mold in a heating zone and raising the temperature of the heating zone to the melting point of the host material, withdrawing the mold from the heating zone at a rate of about 1.5 to 3 inches per day whereby a crystal will form in the mold starting from a seed at the bottom of the mold, and thereafter annealing the formed crystal for about 0.5 to 6 hours at a temperature which is below the melting point of the host material.

5. The method of claim 4 wherein the annealing temperature is 100° C. to 200° C. below the melting point of the host material.

6. In the method for producing crystals capable of amplifying wave energy by stimulated emission of radiation and containing about 0.005 to 5 percent by weight of a trivalent element selected from the group consisting of the rare earths and transition elements, the steps of mixing a host material with a leaching agent and a compound containing an element selected from the group consisting of the rare earths and transition elements capable of existing in a trivalent form, the host material being such as to accommodate stimulated emission of radiation in single crystal form, placing said mixture in an elongated mold, heating said mold in a heating zone and raising the temperature of the heating zone to the melting point of the host material whereby a crystal will be formed in the mold starting from a seed at the bottom of the mold, withdrawing the mold from the heating zone at a rate of about 1.5 inches per day, and thereafter annealing the formed crystal for at least twenty-four hours at a temperature in the range of about 100° C. to 200° C. below the melting point of the host material.

References Cited

UNITED STATES PATENTS 3,203,899    8/1965    Fisher _____ 252—62.51

OTHER REFERENCES

Guggenheim, Journal of Applied Physics, vol. 32, No. 7 (July 1961), pp. 1337 and 1338.

Lawson et al., "Preparation of Single Crystals," Butterworth Scientific Publications, London (1958), p. 58.

Pringsheim, Fluorescence and Phosphorescence (Interscience Publishers, Inc., New York, 1949), pp. 478–480.

HOWARD S. WILLIAMS, Primary Examiner

U.S. Cl. X.R.

331—94.5; 204—157.1; 252—301.4, 301.6